US006115128A

United States Patent [19]
Vann

[11] Patent Number: 6,115,128
[45] Date of Patent: Sep. 5, 2000

[54] MULTI-DIMENSIONAL POSITION SENSOR USING RANGE DETECTORS

[75] Inventor: Charles S. Vann, Fremont, Calif.

[73] Assignee: The Regents of the Univerity of California, Oakland, Calif.

[21] Appl. No.: 09/079,580

[22] Filed: May 15, 1998

Related U.S. Application Data

[60] Provisional application No. 60/059,130, Sep. 17, 1997.

[51] Int. Cl.[7] ............................ G01B 11/26; G01B 11/14; G01N 21/86
[52] U.S. Cl. .................. 356/375; 356/139.1; 356/152.2; 250/559.38
[58] Field of Search ............................ 340/619; 250/577, 250/559.38; 356/375, 139.09, 182.2, 139.1

[56] References Cited

U.S. PATENT DOCUMENTS

| | | | |
|---|---|---|---|
| 4,788,441 | 11/1988 | Laskowski | 250/559.38 |
| 4,891,772 | 1/1990 | Case et al. | 356/375 |
| 5,123,737 | 6/1992 | Eichweber | 356/152 |
| 5,151,608 | 9/1992 | Torii et al. | 250/559.38 |
| 5,519,204 | 5/1996 | Rudd et al. | 250/559.38 |
| 5,585,626 | 12/1996 | Beck et al. | 250/559.38 |
| 5,600,435 | 2/1997 | Bartko et al. | 356/139.09 |

*Primary Examiner*—F. L. Evans
*Assistant Examiner*—Zandra V. Smith
*Attorney, Agent, or Firm*—Daryl S. Grzybicki; John P. Wooldridge; Alan H. Thompson

[57] ABSTRACT

A small, non-contact optical sensor uses ranges and images to detect its relative position to an object in up to six degrees of freedom. The sensor has three light emitting range detectors which illuminate a target and can be used to determine distance and two tilt angles. A camera located between the three range detectors senses the three remaining degrees of freedom, two translations and one rotation. Various range detectors, with different light sources, e.g. lasers and LEDs, different collection options, and different detection schemes, e.g. diminishing return and time of flight can be used. This sensor increases the capability and flexibility of computer controlled machines, e.g. it can instruct a robot how to adjust automatically to different positions and orientations of a part.

10 Claims, 8 Drawing Sheets

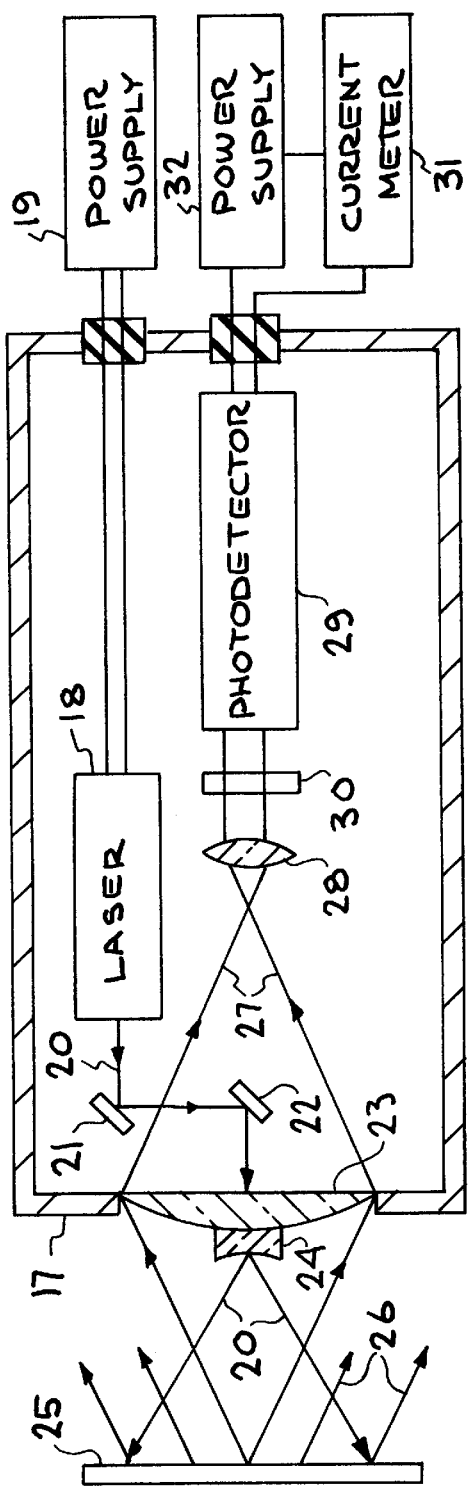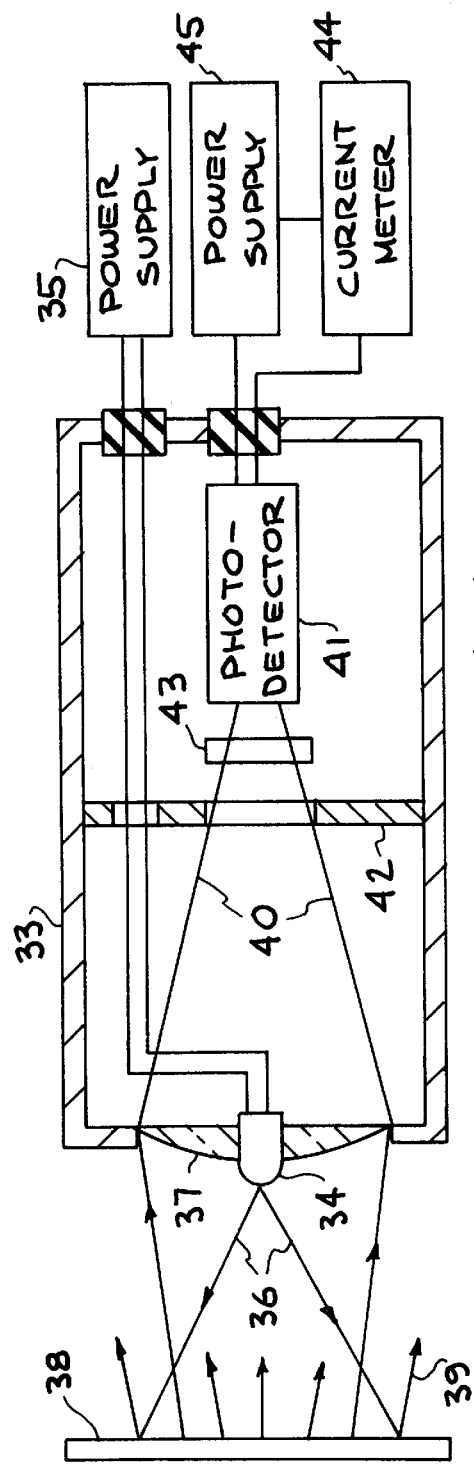

MULTI-DIMENSIONAL POSITION SENSOR USING RANGE DETECTORS

This application claims priority of provisional application Ser. No. 60/059,130 dated Sep. 17, 1997.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to position measurement sensors, and more specifically, it relates to a small, non-contact optical sensor using ranging and imaging to detect the relative position of an object in up to six degrees of freedom.

2. Description of Related Art

Presently, flexible manufacturing operations waste much time and money when changes have to be made in the manufacturing process. For example, if a minor modification is made to the shape of a car body and a robot is used to weld that body, the robot must be "taught" the new shape by an operator. That is, the operator must guide the robot tool by hand through each motion and every orientation in the welding operation. Besides being time consuming, this process is often inaccurate. It is also expensive because this is down time for both the robot and the operator. Furthermore, every part must be positioned exactly where the robot expects it to be, requiring the use of expensive sensors and positioning devices.

Many companies make non-contact laser sensors. Most are one dimensional (1D) range detectors, a few construct a 3D profile of an object, but the object must move through a fixed laser beam. By scanning a laser beam, a laser range camera can detect all three positions of a stationary object, but it does not detect orientation. Laser coordinate measuring systems (laser trackers) also detect three positions of a stationary object, but, made for large work volumes, they are too big (>1 ft$^3$) and too expensive (~$150,000) to mount on a robot or machine head.

U.S. patent application Ser. No. 08/719,061 describes a six degrees of freedom (SixDOF) optical sensor which utilizes a reflective dot and bar on an object, with a single light source, and optics to divide and manipulate reflections onto three photodetectors.

SUMMARY OF THE INVENTION

Accordingly, it is an object of the invention to provide a small, inexpensive, non-contact laser sensor which provides multi-dimensional position measurements of the sensor relative to another object. It is also an object of the present invention to measure up to six degrees of position relative to the other object. It is also an object of the present invention to provide a new range detector, which is an important component of the multi-dimensional sensor, but by itself is a significantly important sensor for one dimensional range measurements or detecting the presence of an object.

The present invention is a small, inexpensive, non-contact laser position sensor that provides multi-dimensional position measurements of the sensor relative to an object. The invention substantially increases the capability and flexibility of computer controlled machines. The multi-dimensional position sensor (MPS) has similar capability to the SixDOF sensor described in Ser. No. 08/719,061. Like the prior SixDOF sensor, the MPS enables the sensing of up to six degrees of freedom relative to an object. However, unlike the prior SixDOF sensor, the MPS does not require reflectors on the object. Instead, it illuminates an object with three beams of light and measures either the angle content or time of the return light to determine distance between each of three range detectors and the object. From these three distances, the tilt and the standoff range of the sensor relative to the object can be computed. A camera located in-between the three range detectors senses the remaining three degrees of freedom; i.e. the two translations and rotation of the sensor relative to a feature on the object. The analog signal output from the detectors and the camera images are digitized and fed into a computer which instructs corrective action for a machine or outputs position readings.

The MPS can be attached to a computer controlled machine and used to control machine operation. Until now, highly agile and accurate machines have been limited by their inability to adjust to changes in their tasks. By enabling them to sense many degrees of position, these machines can now adapt to new and complicated tasks without human intervention or delay, thereby simplifying production, reducing costs, and enhancing the value and capability of flexible manufacturing.

BRIEF DESCRIPTION OF THE DRAWINGS

FIG. 2 shows a range detector with a laser light source, measuring range with a diminishing return technique.

FIG. 3 shows a range detector with a light emitting diode light source, measuring range with a diminishing return technique.

DETAILED DESCRIPTION OF THE INVENTION

Figure 1A:
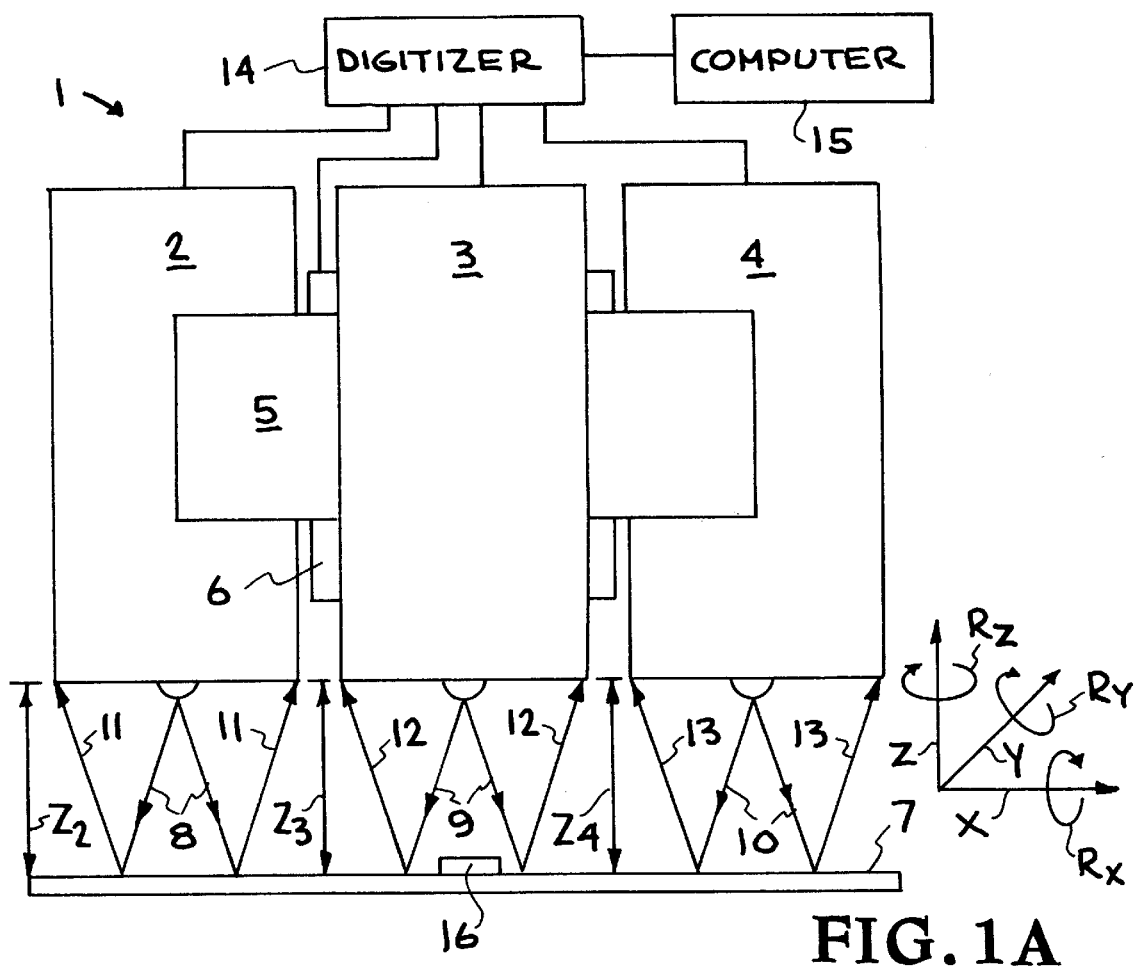
FIGS. 1A, B are side and top views of the assembly of an embodiment of the multi-dimensional position sensor (MPS) of the present invention.
Figure 1B:
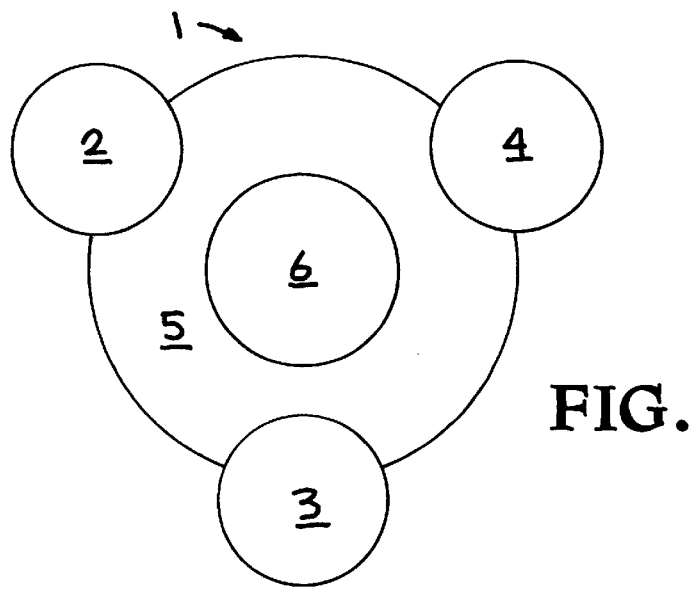

The MPS 1 includes six major components: three light-emitting range detectors 2, 3, 4, a camera 6, digitizer 14, and a computer 15, as shown in FIG. 1A. The three light-emitting range detectors 2, 3, 4 are symmetrically fixed along the radius of a circular support 5, as shown in FIG. 1B. A camera 6 is fixed in the center of the support 5. All the range detectors 2, 3, 4 face a target (surface) 7 such that emitted light beams 8, 9, and 10 from detectors 2, 3, 4 illuminate the surface 7 and reflected light beams 11, 12 and 13 return to the corresponding detectors 2, 3, 4. Likewise, the camera 6 is oriented such that it forms an image of the same surface 7. An analog distance measurement from each detector 2, 3, 4 and images from the camera 6 are fed into a digitizer 14 and the resulting digital information is fed into a computer 15. Computer software uses the data to calculate the position of the sensor 1 relative to the target 7 in up to six degrees of position, represented by the three orthogonal axes X, Y, Z and the three rotational axes Rx, Ry, Rz shown in FIG. 1A.

The sensor 1 is calibrated such that all three distances, Z2, Z3, Z4, measured by the range detectors 2, 3, 4 are the same when target 7 is parallel to sensor 1. Given that all the distances are the same, the measurements would also identify the distance between the sensor 1 and the target 7 (in the Z direction). If the distances are not the same, then the surface is tilted (about Rx and Ry axes) with respect to the sensor, and the computer 15 can calculate the degree of tilt from the three distances. The remaining three of the six position measurements (X, Y, Rz) are provided by the camera. A simple camera 6 can identify the lateral location of the sensor 1 relative to a feature 16 on the target 7 (X and Y distances). The effects of tilt on a lateral measurement are eliminated by first correcting tilt error so that the detectors are normal to the surface 7 when a standoff range is measured. By using a non-symmetric feature 16, the rotation about the normal axis (Rz) can also be determined from the camera image. In software, position measurements are multiplied by a calibration matrix to decouple the information into distinct relative position in up to six degrees of freedom.

As described above, the range detectors 2, 3, 4 are an important component of the MPS. These detectors are compact, inexpensive, and can independently measure range. There are many combinations of the basic components of the range detector; five illustrative embodiments of the range detector that could be used in the MPS are described herein. A first embodiment uses a laser to illuminate a target, determining range by the amount of light returned (diminishing return technique). A second embodiment also uses a diminishing return technique, but instead of a laser it uses a light-emitting diode (LED) as a light source. A third embodiment uses a laser, but instead of the diminishing return technique it uses a time of flight technique to measure distance. A fourth embodiment measures range with an angle content technique, and a fifth embodiment measures range with a light absorption technique.

The first embodiment of a range detector includes a box or case 17, a laser 18, a laser power supply 19, optics 21–24, 28 and 30, a photodetector 29, a measurement display (current meter) 31, and a power supply 32 for the photodetector 29 and display 31, as shown in FIG. 2. The box 17 holds all the optical components and can be hand held or fixed to a reference frame during use. The laser 18 can be either continuous wave or pulsed and is powered by an external power source 19. A switch may be added to turn the laser 18 on and off. The laser generates a collimated laser beam 20 which is reflected by two (or more) mirrors 21 and 22 such that the beam propagates out of box 17 through the center of a collection lens 23. A negative lens 24 is added to diverge the beam at some prescribed angle as it propagates away from box 17. The box 17, and therefore the beam 20, is oriented to illuminate a target 25 at some distance away from the box 17. The target surface may be diffuse or specular (very reflective).

If the target surface is specular and the box 17 is aligned to be near normal to the target 25, much of the return beam 26 will return to the box 17. At some distance between the box 17 and the target 25, called the minimum operating distance, the return beam 26 exactly fills the collecting lens 23. As range increases beyond the minimum operating distance, the diameter of the diverging return beam 26 will also increase and the beam energy per area (fluence) will decrease. Consequently, the amount of return light 26 entering the fixed collecting lens 23 will decrease as a ratio of the radius square of the collecting lens 23 over the radius square of the return beam 26 in the plane of collection. If the target 25 is diffuse, even less of the return beam 26 will return to the collection lens 23 because the fluence will also decrease with range squared.

The collected beam 27 (the portion of the return beam 26 collected by lens 23) passes through focus between the collecting lens 23 and a second lens 28 inside box 17. Because the focal length of the collecting lens 23 is much longer than the focal length of the second lens 28, the diameter of the beam exiting the second lens is smaller in diameter than the diameter of the light entering the collection lens 23 (down-collimation). Furthermore, the light exiting the second lens 28 forms an image of the collecting lens 23 a short distance after exiting the second lens 28. A photodetector 29 is placed at the image of the collecting lens 23. The advantage of down-collimation is that all the collected energy in beam 27 is concentrated onto a small photodetector 29, and the advantage of imaging is that even when the target 25 or box 17 is moving, the collected beam 27 remains imaged onto the photodetector 29. An optical bandpass filter 30 may be placed between lens 28 and photodetector 29 and transmit the laser light, rejecting or absorbing light of other wavelengths.

The optics described above can be arranged such that only when the reflected beam 26 enters collimated into the collecting lens 23, will all the light of collected beam 27 be focused into the photodetector 29. In the case of a diffuse target, the reflected beam 26 is collimated when the diameter of illumination on the target 25 is about the same diameter as the collecting lens 23. If the diffuse target 25 is moved closer in that case, the illumination spot will be smaller on target 25, the reflected beam 26 will diverge when entering the collection lens 23, and some of the collected beam 27 will overshoot the photodetector 29. Consequently, the amount of the collected beam 27 entering the photodetector 27 increases with distance. The degree of increase is a ratio of the area of the collected beam 27 (at the photodetector 29) relative to the area of the photodetector 29. Importantly, this is an opposite trend to the non-linear decrease in return energy due to distance. Combining these two non-linear and opposite trends has the benefit of linearizing the output.

The current output from the photodetector 29 is proportional to the amount of light from collected beam 27 which illuminates it. A current meter 31 with a power source 32 displays the current output from the photodetector 29 and is calibrated to indicate the absolute distance between the box 17 and the target 25. The current output can also be digitized and displayed on a digital display or computer.

The second embodiment of a range detector has a light-emitting diode as an illuminator instead of a laser, as shown in FIG. 3. A box 33 again holds all the optical components and can be hand held or fixed to a reference frame during use. The light-emitting diode 34 can be either continuous or pulsed and is powered by an external power source 35. The light beam 36 from the light-emitting diode 34 is inherently diverging so no negative lens is necessary. The amount of divergence can be controlled by either fixing it to the outside of the collection lens 37, as shown, so that the angle of beam divergence will be that of the diode 34, or by fixing the light emitting diode 34 to the inside of the collecting lens 37 so that the divergence will be less because of the converging effect of the collection lens 37, or by adding a small convex lens to the front of the light emitting diode 34.

As in the first embodiment, the light beam 36 illuminates a target 38 and some of the (reflected) return beam 39 is collected by the collection lens 37. However, this version differs from the other in that a diffuse target 38 is assumed, and even when the target 38 or the box 33 is moved, return light enters the collecting lens 37 and illuminates the photodetector 41 (since diffuse targets are less sensitive to angular changes). Consequently, a second lens is not necessary to redirect the collected beam 40 inside the box 33 by imaging. Instead, the collected beam 40 directly illuminates the photodetector 41 after passing through an aperture 42 and an optical filter 43. The electronics are the same with a current meter (display) 44 and a power supply 45.

A limitation of these two embodiments is that in certain applications the target surface may be unknown or irregular, causing ambiguous measurements with the diminishing return technique. In those situations, the time of flight technique is better since the type of surface does not affect the measurement. Therefore, a third embodiment compares the time difference between the start and return of a laser pulse to calculate distance. Knowing the speed of light, the electronics can accurately calculate the distance between the target and the sensor. The third embodiment uses the same components and configuration as in the first, except that micropower impulse electronics (as described in U.S. patent application Ser. No. 08/486,081) are included to compute the time difference.

Figure 4:
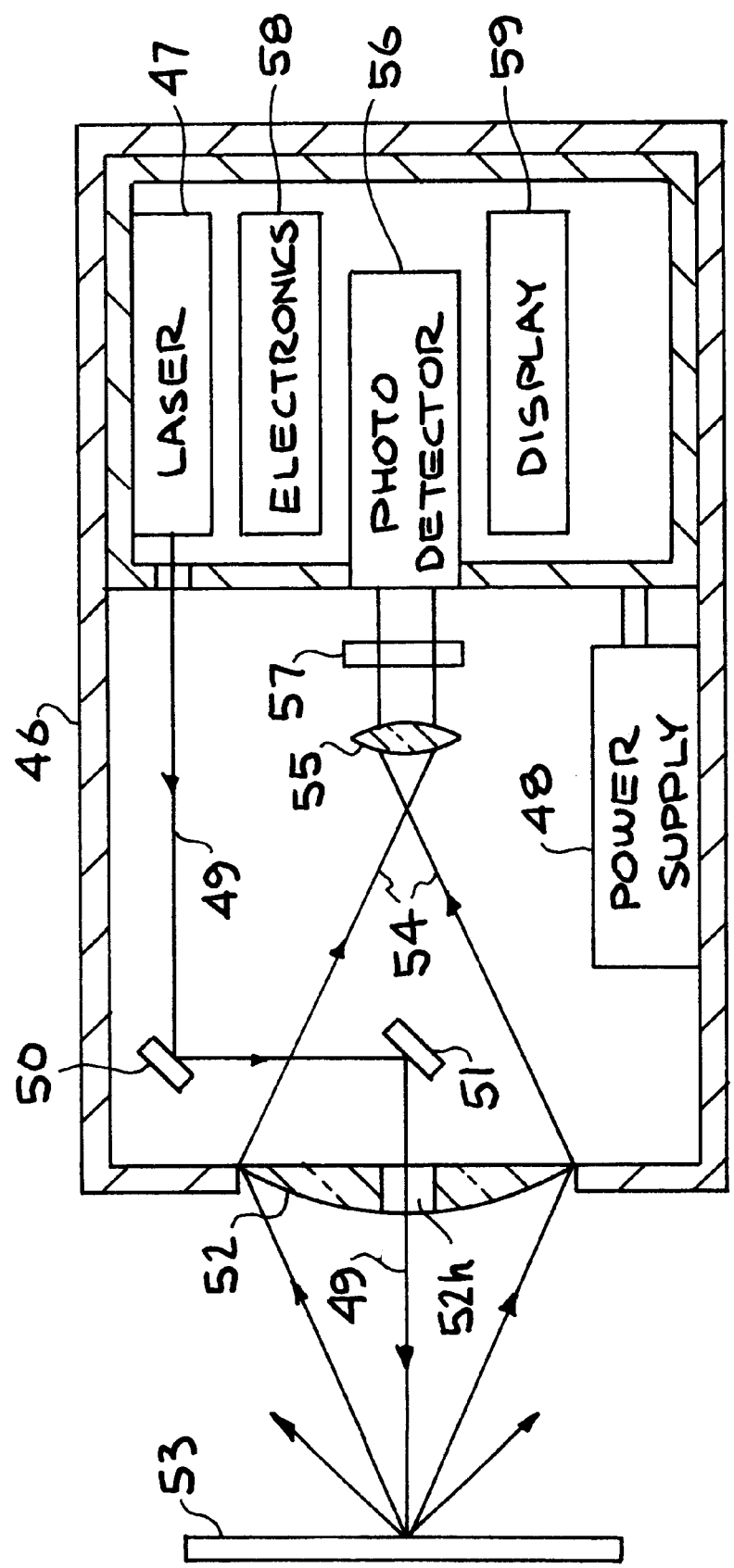
FIG. 4 shows a range detector with a laser light source, measuring range with a time of flight technique.

The third embodiment of a range detector includes a box 46, a laser 47, a power supply 48, optics 50–52, 55 and 57, a photodetector 56, micropower impulse electronics 58, and a measurement display 59, as shown in FIG. 4. The box 46 holds all the optical components and can be hand held or fixed to a reference frame during use. The laser 47 has a pulsed output and is powered by an internal power source 48. A switch may be added to turn the laser 47 on and off. The laser 47 generates a collimated laser beam 49, which is reflected by two mirrors 50 and 51 such that the beam propagates out of box 46 through a hole 52$h$ in the center of a collection lens 52 and is directed towards a target 53 at some distance away from the sensor. A negative lens (like lens 24 of FIG. 2) can be attached to the collection lens 52 to diverge the beam if desired. (A diverging beam will increase the probability of light 49 returning into the sensor when reflected from a jittering target, such as a vibrating liquid.)

When the beam 49 illuminates a target 53, the reflected light off the target may be diffuse (as shown in FIG. 4) or specular. A portion of the reflected return light 54 will be collected by the collecting lens 52. A second lens 55 down collimates the collected light 54 and images it onto a photodetector 56. Again, the advantage of down-collimation is that all the collected energy in beam 54 is concentrated onto a small photodetector 56, and the advantage of imaging is that even when the target 53 or box 46 are moving, the collected beam 54 remains imaged onto the photodetector 56. An optical bandpass filter 57 may be placed between lens 55 and photodetector 57, and transmit the collected laser light 54, rejecting light of other wavelengths. When the photodetector 56 is illuminated by light, its current output immediately changes. The micropower impulse electronics 58 compares the return time of the pulse with the start time of the pulse. Knowing the speed of light, the time of flight of the light can be used to accurately calculate the distance between the target 53 and the box 46. Since the amount of return light is not a factor in this embodiment, the type of target 53 is not a factor as long as some return light can be detected. The electrical signal can be digitized and displayed on a digital display 59 or computer.

Figure 5:
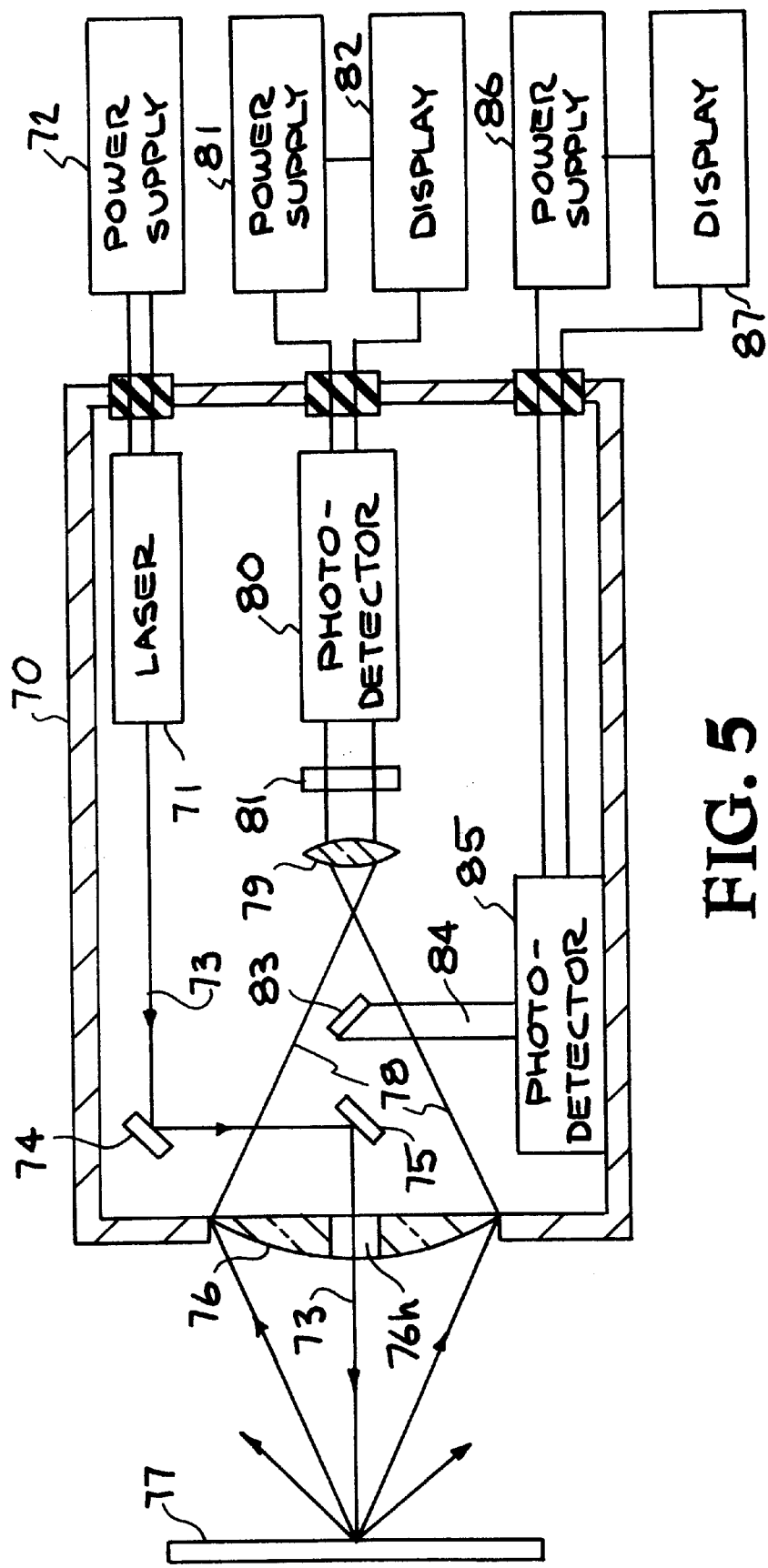
FIG. 5 shows a range detector with a light emitting diode light source, measuring range with an angle content technique.

The fourth embodiment does not require a cooperative target; i.e., the range measurement is not affected by a difference in target color, texture, or material. The range detector includes a box 70, a laser 71, three power supplies 72, 81, 86, optics 74–76, 79, 81, and 83, two photodetectors 80, 85, and two measurement displays 82, 87 as shown in FIG. 5. The box 70 holds all the optical components and can be hand held or fixed to a reference frame during use. The laser 71 has a pulsed or continuous wave output and is powered by a power source 72. A switch may be added to turn the laser 71 on and off. The laser 71 generates a collimated laser beam 73, which is reflected by two mirrors 74 and 75 such that the beam propagates out of box 70 through a hole 76$h$ in the center of a collection lens 76 and is directed towards a target 77 at some distance away from the sensor.

When the beam 73 illuminates a target 77, the light reflected off the target may be diffuse (as shown in FIG. 5) or specular. A portion of the reflected return light 78 will be collected by the collecting lens 76. A second lens 79 down collimates the collected light 78 and images it onto a photodetector 80. Again, the advantage of down-collimation is that all the collected energy 78 is concentrated onto a small photodetector 80, and the advantage of imaging is that even when the target 77 or box 70 are moving, the collected beam 78 remains imaged onto the photodetector 80. An optical bandpass filter 81 may be placed between lens 79 and photodetector 80, transmitting the collected laser light 78 and rejecting light of other wavelengths. The photodetector 80 is connected to a power source 81 and a current display 82.

A small mirror 83 is located to reflect a portion of the collected light 78, forming a smaller beam 84 which is directed into a second photodetector 85. Photodetector 85 is connected to a power source 86 and a current display 87. As in the first three embodiments, the light entering the range detector diminishes with distance. This diminishing signal is caused by a decreasing acceptance angle, or cone size, of light collected from the target. Likewise, the light reflected by mirror 83 into photodetector 85 decreases with this decreasing acceptance angle of light from the target. If the amount of light from the target changes for reasons other than distance, both detectors are affected proportionally. Thus, if the output of photodetector 80 is divided by the output of photodetector 85 a ratio is formed which is dependent only on range of the sensor from the target, canceling out other effects.

Figure 6:
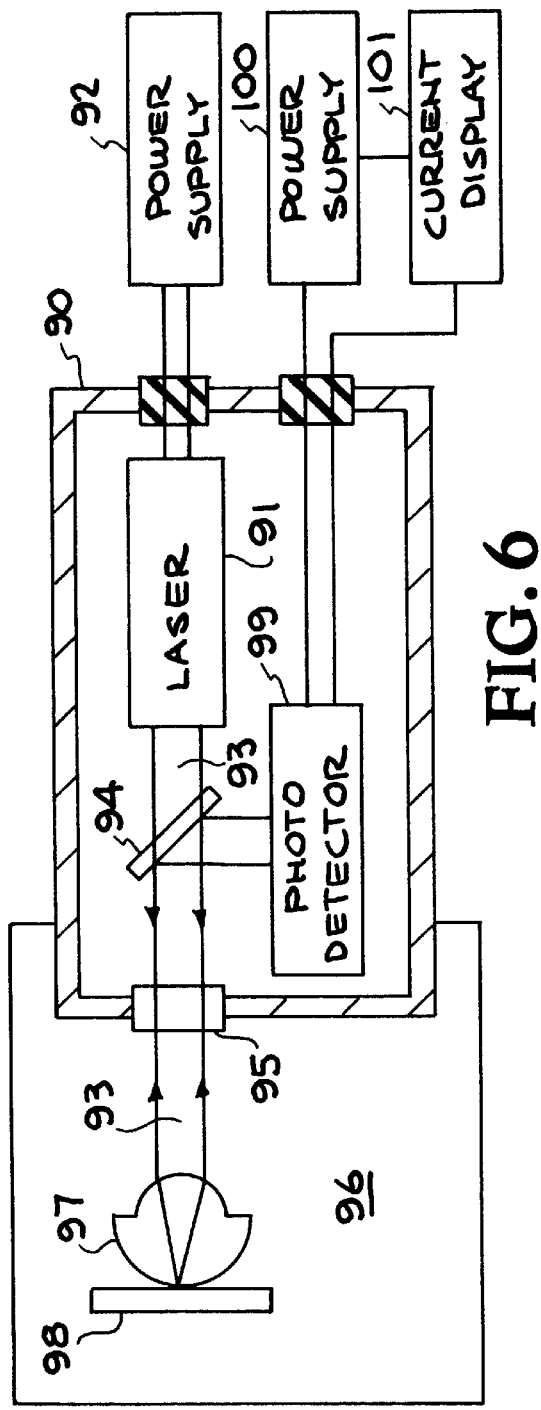
FIG. 6 shows a range detector with a laser light source, measuring range with a light absorption technique.

In the fifth embodiment, medium absorption is used to diminish the laser signal with range. The range detector consists of a box 90, a laser 91, a power supply 92, a polarizer 94, a quarter wave plate 95, a retro-reflector (or mirror) 97, a photodetector 99, with its own power supply 100 and current display 101 as shown in FIG. 6. The box 90 holds all the optical components and can be hand held or fixed to a reference frame during use. The laser 91 has a pulsed or continuous wave output and is powered by a power source 92. A switch may be added to turn the laser 91 on and off. The laser 91 generates a collimated laser beam 93 which propagates through the polarizer 94 and through quarter wave plate 95 out of box 90. If the laser beam 93 is not linearly polarized, the polarizer 94 makes it so. The quarter wave plate 95 converts the linearly polarized light into circularly polarized light. The medium 96, into which beam 93 is directed, transmits the light but absorbs some amount per distance. A reflector 97—e.g., cat's eye, corner-cube, or mirror—on target 98 reflects the beam back on itself such that it again passes through the quarter wave plate 95 back into box 90. Because the light has reflected back onto itself, the direction of the circular polarization is reversed, causing the quarter wave plate 95 to change the beam polarization to a linear polarization 90 degrees different from its orientation when exiting the sensor. Thus, the light reflects from the polarizer 94 and illuminates a photodetector 99. The photodetector 99 has a power source 100 and a current display 101. If no medium 96 was present, the amount of light beam 93 returning to the photodetector 99 would be constant. However, when a medium 96 is present, it absorbs a certain amount of the light per distance traveled through it. Since the decrease of light is detected by the photodetector 99, that distance can be measured with the device.

Figure 7:
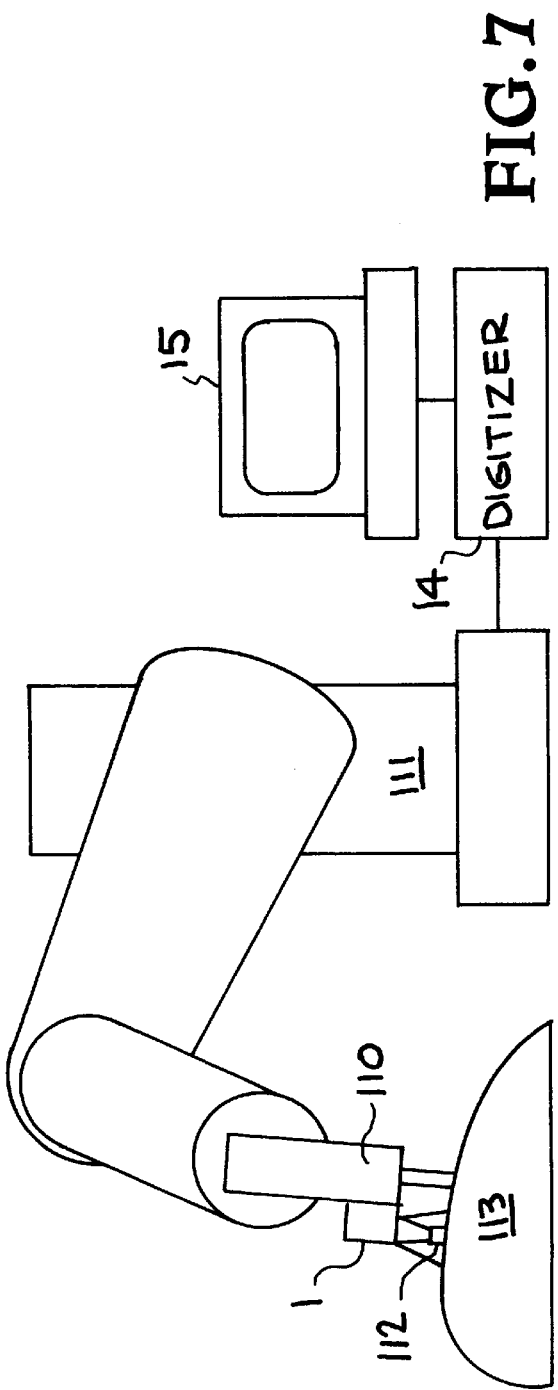
FIG. 7 shows a multi-dimensional position sensor mounted on a robot which is manipulating a part.

FIG. 7 shows the MPS 1 located on the tool head 110 of a multi-axis manipulator robot 111 for sensing its position and orientation relative to a feature 112 on the part 113. MPS 1 is connected through robot 111 to digitizer 14, which is connected to computer 15. Once the robot 111 knows where it is relative to the feature 112, the computer 15 can instruct the robot 111 to calibrate its position to the feature 112. After calibration, the computer 15 can instruct the robot 111 to follow a multi-dimensional path pre-described in the computer drawings of the part, or it can be programmed to move to the next feature on the part. Either way, the robot 111 autonomously follows the path, performing its machining task, even if the path is significantly different from its last operation.

The MPS provides the following advantages over existing technology:

(1) The MPS eliminates the need for machine "training." With a MPS and 3D information on the part, the robot's path and tool orientation can be written in software, and any changes to the process can be made by downloading new software, avoiding the need for "training" by an operator.

(2) The MPS enables process changes without halting production. Since software can be downloaded quickly into a robot's controller, production is not delayed.

(3) It avoids the need for precise positioning of parts in the workplace. As long as the part feature comes into the sensor's field of view, the sensor can determine its relative position. Since its field of view can be many millimeters, typical placement accuracy can be substantially relaxed.

(4) The MPS is capable of tracking all six degrees of freedom (DOF). Some manufacturing operations require 6-DOF information during the process. For example, welding requires 3-DOF of information to locate the weld and three additional DOF to properly orient the tool relative to the part.

(5) It is accurate. The range detectors and camera can be designed for a sub-millimeter accuracy.

(6) It is small and easily mounted to a machine. At less than 300 cm$^3$ and 200 grams, the MPS can be easily mounted on the head of a manufacturing machine without interfering in its operation.

(7) It is inexpensive. All components of the MPS are commercially available, providing the benefits of low cost.

(8) It uses standard machine instruction software. As common in the manufacturing industry, machine path instructions can be generated in software directly from computer drawings of the part. This direct transfer of information is efficient, cost effective, and minimizes errors.

(9) The MPS is easy to set up. Only the identification of a feature of interest is required, such as a bolt, hole, print, or paint.

(10) It is non-contact. As an optical sensor, it does not physically contact, and therefore does not damage the part in any way.

The MPS is the only single sensor capable of determining all six degrees of freedom relative to an object without reflectors on it. Other sensors are capable of detecting up to three degrees of position but not more. This additional information enables flexible automation of complex tasks which now can only be performed manually or after extensive machine training by a human operator. Consequently, robots or other computer controlled machines, which were until now underutilized, can perform six axis tasks, autonomously. With smarter robots, a change in manufacturing specifications no longer causes costly production delays, and customer's needs can more readily be accommodated.

In addition to guiding robots in the performance of manufacturing operations such as welding, milling, assembly, and deburring, this sensor can be used in a wide variety of other applications. Generally, the MPS can be used in any task that uses computer controlled machines, such as the following.

(1) Parts can be assembled by sensing their relative alignment and correcting the difference. For example, the MPS could be mounted on a crane so the accuracy of grabbing an object can be monitored.

(2) The contour of parts can be inspected or mapped relative to a known feature. The MPS can compare and map features that are either made or placed on a part to other features on the part.

(3) An object can be guided relative to a reference platform. With a MPS located on a fixed reference platform, it can detect a deviation of an object's movement relative to a desired path and provide guidance on how to bring the object back on line. The target could be tracked from centimeters to many meters from the sensor.

(4) Surface motion can be tracked. To evaluate the effect of external forces on an object, the MPS can be mounted to a fixed frame and measure the motion of an object.

(5) Dangerous tasks can be remotely performed. The sensor enables remote manipulation of radioactive, toxic, or explosive materials. For example, a robot with a MPS could track a reference mark on an operator's hands while he disassembles a dummy bomb, and another robot, electronically slaved to the motions of the first robot, would disassemble the real one.

The MPS is an enabling technology that should have significant impact on flexible automation. Many of its future applications are not yet identified.

It should be noted that the embodiments described above for range detection can be of great value by themselves in that the techniques of either diminishing return or time of flight have many applications with some of them listed below.

One application of the light-emitting range detector is for fluid level sensing. In one configuration, the range detector is positioned normal to the liquid surface (parallel to the gravity vector) and illuminating downward. The light reflecting from the liquid back into the collecting lens of the range detector would be measured to determine the fluid level in the container.

In another configuration, the range detector is oriented at a significant angle to the gravity vector so the light reflected from the liquid surface does not return to the detector. In this case, the laser beam would pass through a transparent liquid and illuminate the bottom of the container. If the container bottom has a non-specular surface, the light will diffusely reflect with some of it returning to the range detector. In this case, the amount of light returning is a measurement of the depth of the liquid. This is possible because the liquid will absorb the light linearly with distance through it. The amount of light collected when no liquid is present will be measured so that any reduction in that measurement will indicate the presence of a liquid, and the degree of that reduction will indicate the depth of the liquid. Likewise, this sensor can be used to measure the thickness (or quantity) of translucent solid materials.

Another configuration for the range detector is to identify the presence of different liquids in a container. Different liquids absorb or transmit different wavelengths of light (absorption spectrum). Consequently, range detectors emanating different wavelength light can detect the presence of different liquids in a vessel. For example, one range detector diffusely reflecting from the bottom of a tank could measure gasoline level by the amount of light it absorbs, but be insensitive to whether water was mixed with the gasoline because that specific illumination wavelength is absorbed at about the same rate for water as it is for gasoline. However, another range detector could emanate a light of a different wavelength, which is absorbed by water at a much faster rate than by gasoline, such that the amount of water in the gasoline could be measured. Therefore, by comparing the measurement from both range detectors, the presence of water in the gasoline could be detected.

Another application for the range detector is identifying the clarity or type of liquid when the fluid depth and the range above the vessel floor is fixed. This is possible because the amount of light absorbed by a liquid varies with the clarity and type of liquid. For example, when water is hazy, it will absorb more light than when it is clear such that the range detector can measure a reduction in light returned. Likewise, this sensor can be used to measure the degree (or purity) of translucent solid materials.

Another application for the range detector is for use as an "on/off" switch. For example, an object like a paper cup can be inserted into an automatic liquid dispenser such that it is illuminated near the top of the cup on the inside. When the dispenser fills the cup to the point of blocking/absorbing the illumination on the cup, the light returning to the sensor drops. When the signal drop causes the current/voltage from the photodetector to go below a set threshold, the fluid dispensing is turned "off."

Figure 8:
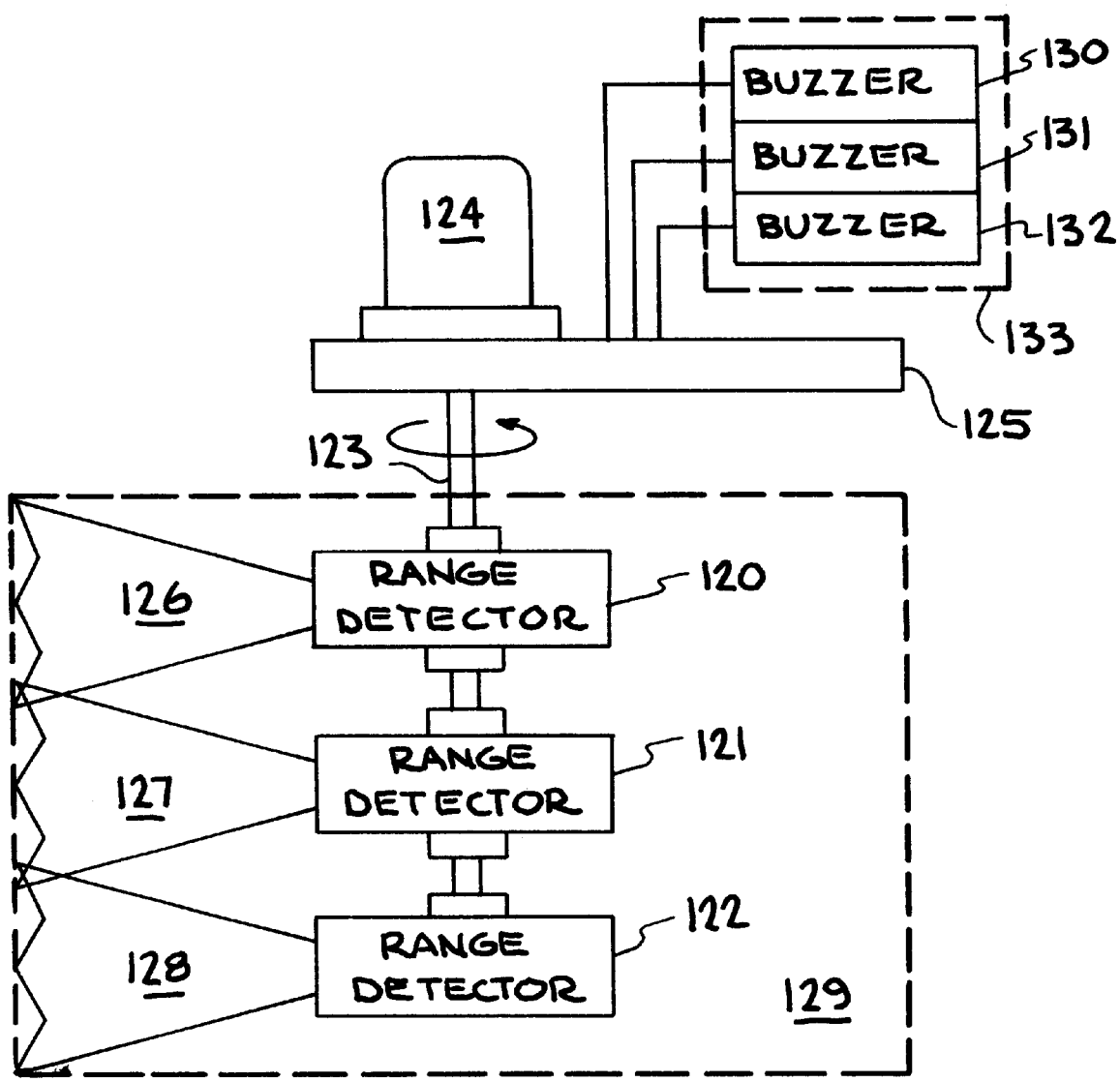
FIG. 8 shows three range detectors mounted on a revolving device and scanning a volume.

Another application of the range detector is for collision avoidance; e.g., such a device can be placed in front of a blind person or a crane to alert the user of the presence of an unexpected object in their path. Such a device could have one or more range detectors configured together and mechanically rotated to sweep a volume, detecting the presence and three dimensional location of any object in that volume. An illustrative configuration has three range detectors 120–122 fixed to a rod 123 which is rotated by a motor 124, and the motor and rod are supported by a bar 125, as shown in FIG. 8. Each range detector 120–122 generates a corresponding light beam 126–128, which during a full rotation of the rod 123 sweeps a volume 129. Any object close enough to be detected by one of the range detectors would generate a current which could sound a device to alert the user. For example, each range detector could be attached to a buzzer 130–132. Each buzzer could have a different pitch such that the user could identify which range detector is activated, providing the user a rough estimate of the height of the object. Furthermore, the intensity (volume) of the signal could indicate the range of the object from the range detector; i.e., a higher volume would indicate that the object is close and a fainter volume would indicate that the object is far away from the range detector. In addition to height and range of the object, its angular position could be determined by comparing the time of object-detection relative to a reference signal. For example, a reference signal could be generated each time the range detectors sweep under the support bar 125, illuminating the bar 125 such that a short-term, buzzer signal is produced. Arbitrarily assuming that it takes one second for the illumination to sweep the volume in a counter-clockwise rotation, the reference signal will sound again in one second. However, if the buzzer sounds by detection, an object at 0.25 seconds after the reference signal, then the angular location of the object (relative to users walking forward with the bar in front of them) can be calculated at 90 degrees. It is noteworthy that the illumination beams 126–128 could be made planar to reduce the amount of light needed. A plane of light can be formed by optics or using the inherent characteristics of a light emitting diode or laser.

Another application for the range detector is accurately measuring fluid level in very small (e.g., micro-liter), open vessels. Existing fluid level sensors are too large and often touch the liquid, potentially contaminating it. Furthermore, existing fluid level sensors do not provide sufficient accuracy. Because the liquid volume is so small, measuring to less than a percent of volume requires extremely accurate level measurement; e.g., 25 micrometers for 0.25 percent accuracy of a 200 microliter vessel (e.g., 10 mm high, 5 mm diameter). At that accuracy requirement, existing laser range finders are too coarse. However, a range detector provides high accuracy at low cost and has the added benefit of being a non-contact sensor. In general, a range detector similar to the embodiment shown in FIG. 3 could be used for this application but modified to locate the photodetector off axis from the light source such that the amount of light reflected into the photodetector depends on the level of the fluid in the vessel.

Figure 9B:
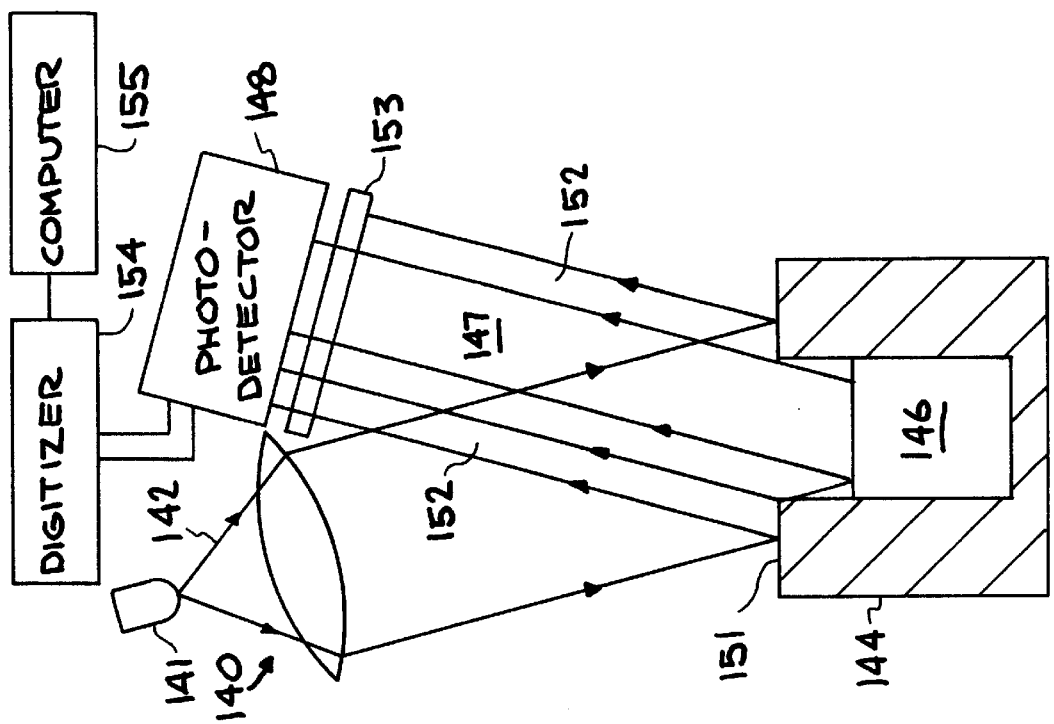
FIGS. 9A, B show a range detector measuring different levels of fluid in a small open vessel.
Figure 9A:
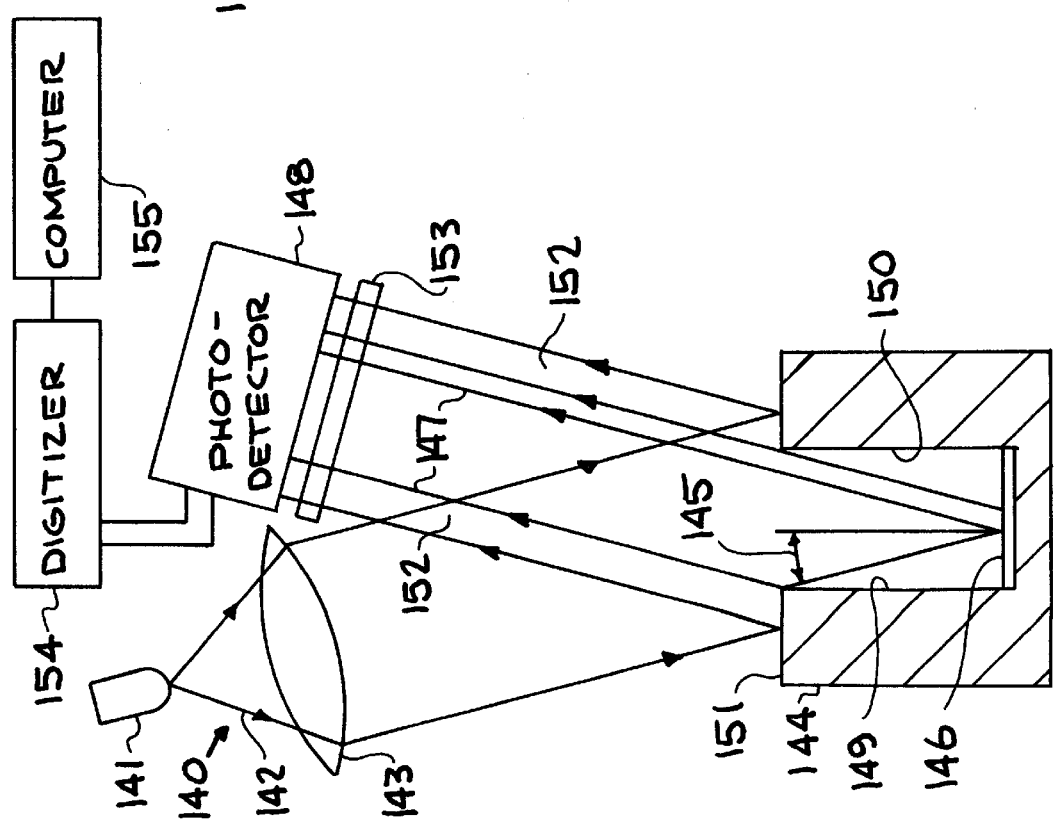

Specifically, a range detector 140 for measuring fluid level in a small, open vessel includes a light source 141, a lens 143, a photodetector 148, a digitizer 154, and a computer 155 as shown in FIG. 9A. The light source 141 (e.g., a light emitting diode) generates a beam of light 142 which is collimated by a lens 143. The beam of light is oriented to over illuminate the opening in a vessel 144 at a precise angle 145. The angle is selected so that even when the vessel 144 is near empty, a small fraction of the light in beam 142 will reflect off the liquid (fluid) 146 and be directed as a beam 147 to a photodetector 148. The wall 149 nearest to the light source 141 shadows the light in beam 142 from the liquid 146, and much of the light in beam 142 strikes the opposite vessel wall 150 instead. The light in beam 142 which initially strikes the vessel wall 150 will subsequently reflect off the fluid 146 such that it is directed away from the photodetector 148. Some light 142 initially reflects off the fluid 146 and subsequently off the wall 150 such that it is also directed away from the photodetector 148. The remainder of the light in beam 142 reflects off the vessel's top surface 151, forming a beam 152, which may be partially collected by the photodetector 148. As the level of the fluid 146 increases, the size of light beam 147 directly reflected from the fluid 146 to the photodetector 148 will correspondingly increase, as shown in FIG. 9B. Consequently, the amount of light measured by the photodetector 148 directly and linearly indicates the level of fluid 146 in the vessel 144.

The photodetector 148 is extremely sensitive to light and is large enough to capture all the light beam 147 directly reflecting from the fluid 146 and the light beam 152 reflected from the vessel top 151. An optical bandpass filter 153 passes only light from the light source 141, blocking light of other wavelengths. When the vessel 144 is empty, only light reflecting from the top 151 of the vessel and a small amount from the bottom of the vessel is collected by the photodetector 148. This zero fluid value is subtracted from future measurement signals, i.e., a zero calibration factor. Minor lateral misalignments of the beam 142 on the vessel opening does not change the zero value since more light on the vessel's top surface 151 on one side of an opening is compensated by less light on the opposite side of the opening. However, during measurements, tilt variations of the vessel 144 relative to the light beam 142 must be avoided because due to shadowing, tilt increases/decreases the amount of light illuminating the liquid 146, resulting in an erroneous fluid level reading. The analog output signal from the photodetector 148 can be digitized with an analog to digital converter 154 and fed into a computer 155. With a digital reading, the number of bits in the converter determines the accuracy of the range detector 140. For example, a 12-bit analog to digital converter will divide the analog signal into 4096 parts. If the difference between an empty and full vessel were 200 milliliters (e.g., 10 mm high, 5 mm diameter vessel), then the resolution of the range detector for that particular vessel would be 2.5 micrometer (10 mm/4096).

Figure 10:
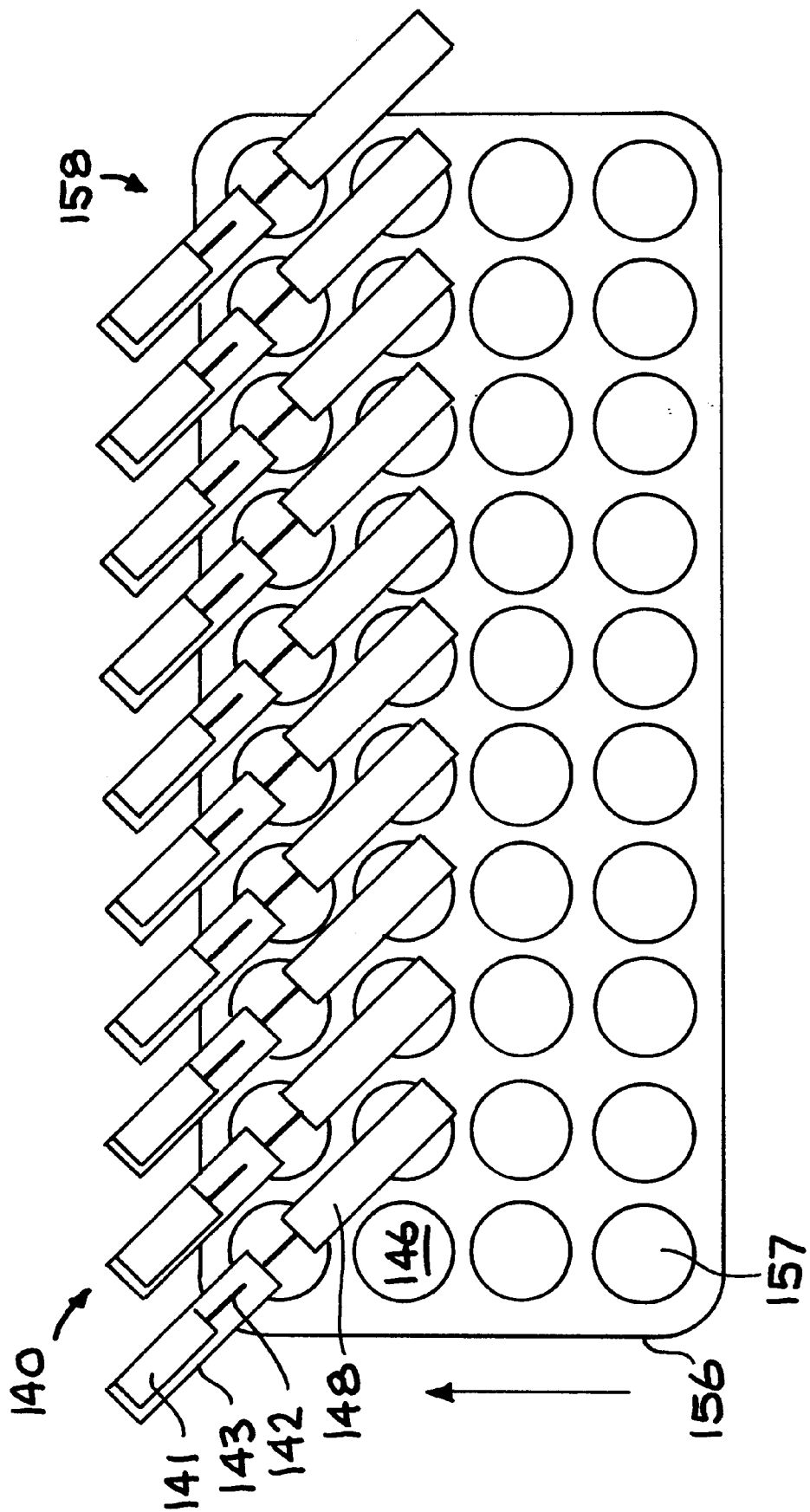
FIG. 10 shows a row of range detectors measuring the fluid levels of an array of open vessels.

This configuration of a range detector can easily be stacked side by side to form a closely packed array 158 of detectors 140. This array may be particularly useful for measuring fluid levels in a plate 156 of vessels (openings) 157, as shown in FIG. 10. The range detector can be oriented at 45 degrees with respect to straight columns of openings to fully take advantage of the space between the openings. Either the detector array 158 or plate 156 of vessels can be moved a row at a time (as shown by arrow) until the fluid level of each vessel is measured.

Changes and modifications in the specifically described embodiments can be carried out without departing from the scope of the invention, which is intended to be limited by the scope of the appended claims.

What is claimed is:

1. A sensor which measures its position in multi-dimensions relative to an object, comprising:
    a plurality of light-emitting range detectors which measure the range from the sensor to at least three different points on the object such that tilt and range of the sensor relative to the object can be determined;
    a camera which images a feature on the object such that translation and rotation of the sensor relative to that feature can be determined;
    a digitizer which converts analog signals from the range detectors and image information from the camera to digitized data;
    a computer which uses the digitized data to calculate multiple axes of position of the sensor relative to the object.

2. The sensor of claim 1 wherein each range detector comprises:
    a light source which produces an output beam;
    a photodetector which produces an output signal proportional to the amount of light incident thereon;
    a first lens which collects light reflected from the object when illuminated by the light source;
    a second lens, which in combination with the first lens, images the collected light onto the photodetector such that the light entering the first lens illuminates the photodetector even if the incoming light is at an angle different from the optical axis of the first lens;
    a display device connected to the photodetector which can directly display or record changes in the output signal or digitize the output signal and feed it into a computer.

3. The sensor of claim 1 wherein each range detector comprises:
    a light source which produces an output beam;
    a photodetector which produces an output signal proportional to the amount of light incident thereon;
    a lens which collects light reflected from the object when illuminated by the light source, and directs collected light onto the photodetector;
    a display device connected to the photodetector which can directly display or record changes in the output signal or digitize the output signal and feed it into a computer.

4. The sensor of claim 1 wherein each range detector comprises:
    a pulsed light source which produces an output beam comprising a sequence of pulses;
    a photodetector which produces an output signal proportional to the amount of light incident thereon;
    a first lens which collects light reflected from the object when illuminated by the light source;
    a second lens, which in combination with the first lens, images the collected light onto the photodetector such that the light entering the first lens illuminates the photodetector even if the incoming light is at an angle different from the optical axes of the first lens;
    a micropower impulse electronic circuit which compares the time a pulse is transmitted toward the object to the time its reflected pulse is received to obtain time of flight and range.

5. The sensor of claim 2 wherein each range detector further comprises:
    a second photodetector which produces an output signal proportional to the amount of light incident thereon;
    a mirror positioned between the first and second lens to deflect a portion of the collected beam onto the second photodetector;
    a second display device connected to the second photodetector which can directly display or record changes in the output signal or digitize the output signal and feed it into a computer;
    where in the ratio of the output from the first photodetector to the output of the second photodetector is dependent only on range.

6. The sensor of claim 1 wherein each range detector, comprises:
    a light source which produces an output beam;
    a photodetector which produces an output signal proportional to the amount of light incident thereon;
    a linear polarizer tilted at an angle with respect to the laser beam which passes a beam having a first linear polarization;
    a quarter wave plate positioned after the polarizer which passes the beam and converts the beam to a circular polarization;
    a reflector mounted to an object in the absorbing medium which reflects light from the source back to the quarter wave plate which converts the beam to a beam having a second linear polarization orthogonal to the first linear polarization, and then to the linear polarizer which reflects the beam to the photodetector;

a display device connected to the photodetector which can directly display or record changes in the output signal or digitize the output signal and feed it into a computer.

7. A range detector for measuring the range to an object, comprising:

a light source which produces an output beam;

a photodetector which produces an output signal proportional to the amount of light incident thereon;

a first lens which collects light reflected from the object when illuminated by the light source;

a second lens, which in combination with the first lens, images the collected light onto the photodetector such that the light entering the first lens illuminates the photodetector even if the incoming light is at an angle different from the optical axis of the first lens;

a display device connected to the photodetector which can directly display or record changes in the output signal or digitize the output signal and feed it into a computer.

8. The range detector of claim 7, further comprising:

a second photodetector which produces an output signal proportional to the amount of light incident thereon;

a mirror positioned between the first and second lens to deflect a portion of the collected beam onto the second photodetector;

a second display device connected to the second photodetector which can directly display or record changes in the output signal or digitize the output signal and feed it into a computer;

where in the ratio of the output from the first photodetector to the output of the second photodetector is dependent only on range.

9. A range detector for measuring the range to an object, comprising:

a pulsed light source which produces an output beam comprising a sequence of pulses;

a photodetector which produces an output signal proportional to the amount of light incident thereon;

a first lens which collects light reflected from the object when illuminated by the light source;

a second lens, which in combination with the first lens, images the collected light onto the photodetector such that the light entering the first lens illuminates the photodetector even if the incoming light is at an angle different from the optical axes of the first lens;

a micropower impulse electronic circuit which compares the time a pulse is transmitted toward the object to the time its reflected pulse is received to obtain time of flight and range.

10. A range detector for measuring the range to an object located in an absorbing medium, comprising:

a light source which produces an output beam;

a photodetector which produces an output signal proportional to the amount of light incident thereon;

a linear polarizer tilted at an angle with respect to the laser beam which passes a beam having a first linear polarization;

a quarter wave plate positioned after the polarizer which passes the beam and converts the beam to a circular polarization;

a reflector mounted to an object in the absorbing medium which reflects light from the source back to the quarter wave plate which converts the beam to a beam having a second linear polarization orthogonal to the first linear polarization, and then to the linear polarizer which reflects the beam to the photodetector;

a display device connected to the photodetector which can directly display or record changes in the output signal or digitize the output signal and feed it into a computer.

* * * * *